(12) United States Patent
Hardin

(10) Patent No.: US 10,478,009 B1
(45) Date of Patent: Nov. 19, 2019

(54) BEVERAGE INFUSION SYSTEM

(71) Applicant: Daniel R. Hardin, Hendersonville, NC (US)

(72) Inventor: Daniel R. Hardin, Hendersonville, NC (US)

(*) Notice: Subject to any disclaimer, the term of this patent is extended or adjusted under 35 U.S.C. 154(b) by 260 days.

(21) Appl. No.: 15/482,863

(22) Filed: Apr. 10, 2017

Related U.S. Application Data

(60) Provisional application No. 62/321,281, filed on Apr. 12, 2016.

(51) Int. Cl.
*A47J 31/40* (2006.01)
*A47J 31/44* (2006.01)

(52) U.S. Cl.
CPC ............ *A47J 31/40* (2013.01); *A47J 31/44* (2013.01); *A47J 31/4403* (2013.01)

(58) Field of Classification Search
CPC ......... A47J 31/40; A47J 31/44; A47J 31/4403
See application file for complete search history.

(56) References Cited

U.S. PATENT DOCUMENTS

| | | | |
|---|---|---|---|
| 2015/0191685 A1* | 7/2015 | Kyle | C12C 12/00 99/277.1 |
| 2015/0247110 A1* | 9/2015 | Dale | C12C 5/026 426/592 |
| 2018/0098658 A1* | 4/2018 | Angell | A47J 31/002 |

* cited by examiner

*Primary Examiner* — Anthony J Weier
(74) *Attorney, Agent, or Firm* — Luedeka Neely Group, P.C.

(57) ABSTRACT

A beverage infusion system having an infusion chamber configured to hold an infusing material and to allow a beverage to flow through the chamber past the infusing material. An inlet and outlet are in fluid communication with the chamber for carrying the beverage to and away from the chamber. A heat transfer probe inside the chamber is positioned such that the beverage entering and exiting the chamber flows past the heat transfer probe. A coolant path carries a coolant through the heat transfer probe. When the coolant is at a lower temperature than the beverage flowing through the chamber, heat is carried away from the beverage and is transferred through the coolant probe to the coolant as the beverage flows past the coolant probe. The chamber maintains pressure of the beverage, such that the pressure of the beverage at the beverage outlet is substantially equal to the pressure of the beverage at the beverage inlet.

12 Claims, 5 Drawing Sheets

BEVERAGE INFUSION SYSTEM

CROSS-REFERENCE TO RELATED APPLICATIONS

This application claims the benefit of U.S. Provisional Application No. 62/321,281, filed Apr. 12, 2016, entitled Beverage Infusion Tower System.

FIELD

The present invention relates generally to beverages, and in particular, a beverage infusion tower system for infusing a beverage with flavors from selected ingredients.

BACKGROUND

As used in the following disclosure, the term "infusion" is meant to refer to the transfer of flavor(s) and/or aroma(s) from a selected ingredient(s) to a draft-supplied or other non-draft supplied beverage as a result of the communication between the beverage and the selected ingredient(s). In general, terms such as "coupled to," and "configured for coupling to," and "secured to," and "configured for securing to" and "in communication with" (for example, a first component is "coupled to" or "is configured for coupling to" or is "configured for securing to" or is "in communication with" a second component) are used herein to indicate a structural, functional, mechanical, electrical, signal, optical, magnetic, electromagnetic, ionic or fluidic relationship between two or more components or elements. As such, the fact that one component is said to be in communication with a second component is not intended to exclude the possibility that additional components may be present between, and/or operatively associated or engaged with, the first and second components.

Infusing beverages (such as beer, wine, cider, coffee, or liquor) with selected flavors at the point of dispensing the beverages allows for flavor variations selected by consumers. Depending on the selected infusion ingredients, an essentially unlimited number of infused flavors for the beverage is possible.

However, existing methods for infusing such beverages do not effectively allow for keeping such beverages cool during the infusion process. In addition, existing methods of infusion do not effectively maintain the pressure of the beverage during the infusion process, thus causing deficiencies in the quality of the infused beverage prior to consumption. For example, in the case of draft-supplied carbonated beverages, loss of pressure might result in the loss of carbonation.

What is needed, therefore, is a system that addresses the concerns above.

SUMMARY

The above and other needs are met by a beverage infusion system having an infusion chamber configured to hold an infusing material and to allow a beverage, including carbonated or non-carbonated beverages, to flow through the infusion chamber past the infusing material such that the beverage is infused by the infusing material. A beverage inlet is in fluid communication with the infusion chamber for carrying the beverage to the infusion chamber. A beverage outlet is in fluid communication with the infusion chamber for carrying the beverage to away from the infusion chamber. A tap may be mounted at an end of the beverage outlet.

A heat transfer probe is inside the infusion chamber and is positioned such that the beverage entering the infusion chamber via the beverage inlet and exiting via the beverage outlet flows past the heat transfer probe. A coolant path carries a coolant through the heat transfer probe. When the coolant is at a lower temperature than the beverage flowing through the infusion chamber, heat is carried away from the beverage and is transferred through the coolant probe to the coolant as the beverage flows past the coolant probe. The infusion chamber maintains pressure of the beverage passing through it, such that the pressure of the beverage at the beverage outlet is substantially equal to the pressure of the beverage at the beverage inlet.

In certain embodiments, the infusion chamber includes an outer housing having a first end and a second end and openings formed at each end. In some cases, at least a portion of the outer housing is transparent in order to provide a sight glass into the infusion chamber. The infusion chamber further includes a first enclosure member configured to removably mount to the first end of the outer housing and to cover the opening located at the first end of the outer housing. Also, the infusion chamber includes a second enclosure member configured to removably mount to the second end of the outer housing and to cover the opening located at the second end of the outer housing. In some cases, the beverage inlet is formed in the first enclosure member and the beverage outlet is formed in the second enclosure member. The second enclosure member may include a funnel-shaped inner surface located within the infusion chamber for funneling beverage being carried away from the infusion chamber through the beverage outlet. The beverage outlet includes an opening formed in the second enclosure member that is located at the center of the funnel shape.

In some cases, the heat transfer probe is an elongate probe having a first end mounted to and extending away from the first enclosure member and a second end located within the infusion chamber proximate the second enclosure member. The coolant path includes may include a void space located within the heat transfer probe operable to hold a quantity of coolant. The coolant path may further include a coolant inlet tube extending into the heat transfer probe through the first enclosure member and terminating within the void space proximate the first end of the heat transfer probe. Additionally, the coolant path may include a coolant outlet tube extending into the heat transfer probe through the first enclosure member and terminating within the void space proximate the second end of the heat transfer probe. Coolant flowing along the coolant path flows into the heat transfer probe via the coolant inlet tube, fills the void space, and excess coolant flows out of the heat transfer probe via the coolant outlet tube.

In certain cases, the beverage infusion system includes a first filter configured to removably mount between the first enclosure member and the outer housing, such that the first filter covers the opening located at the first end of the outer housing and is positioned between the beverage inlet and the infusion chamber. In some cases, the first filter includes an aperture, and the elongate probe through the aperture of the first filter. In some cases, the beverage infusion system further includes a second filter configured to removably mount between the second enclosure member and the outer housing, such that the second filter covers the opening located at the second end of the outer housing and is positioned between the beverage outlet and the infusion chamber.

In certain cases, plates located on each of the first and second enclosure members cover the openings at the first end and second end of the outer housing, respectively. The system may also include flanges disposed on the plates and on the first end and second end of the outer housing and clamps for removably clamping the flanges of the plates to the flanges of the outer housing.

In some cases, the beverage infusion system further includes a recirculating coolant chiller disposed along the coolant path for carrying coolant at a high temperature T1 away from the infusion chamber, lowering the temperature of the coolant to a low temperature T2, and flowing the low temperature coolant back to the infusion chamber.

BRIEF DESCRIPTION OF THE DRAWINGS

Further advantages of the disclosure are apparent by reference to the detailed description when considered in conjunction with the figures, which are not to scale so as to more clearly show the details, wherein like reference numbers indicate like elements throughout the several views, and wherein.

DETAILED DESCRIPTION

Various aspects of the automated fill system will become evident to those of skill in the art from the following description. Unless specifically stated otherwise, the order of steps discussed below in conjunction with infusing a beverage with selected ingredients using the beverage infusion tower system is not presented for the purpose of limiting the present invention, but for the purpose of illustration. Those of skill in the art will appreciate that the steps discussed below may be carried out in various orders. The description of implementations below is presented for purposes of illustration. It is not exhaustive and does not limit the claimed invention to the precise forms disclosed. Modifications and variations are possible in light of the description below, or may be acquired from practicing the invention.

Figure 1:
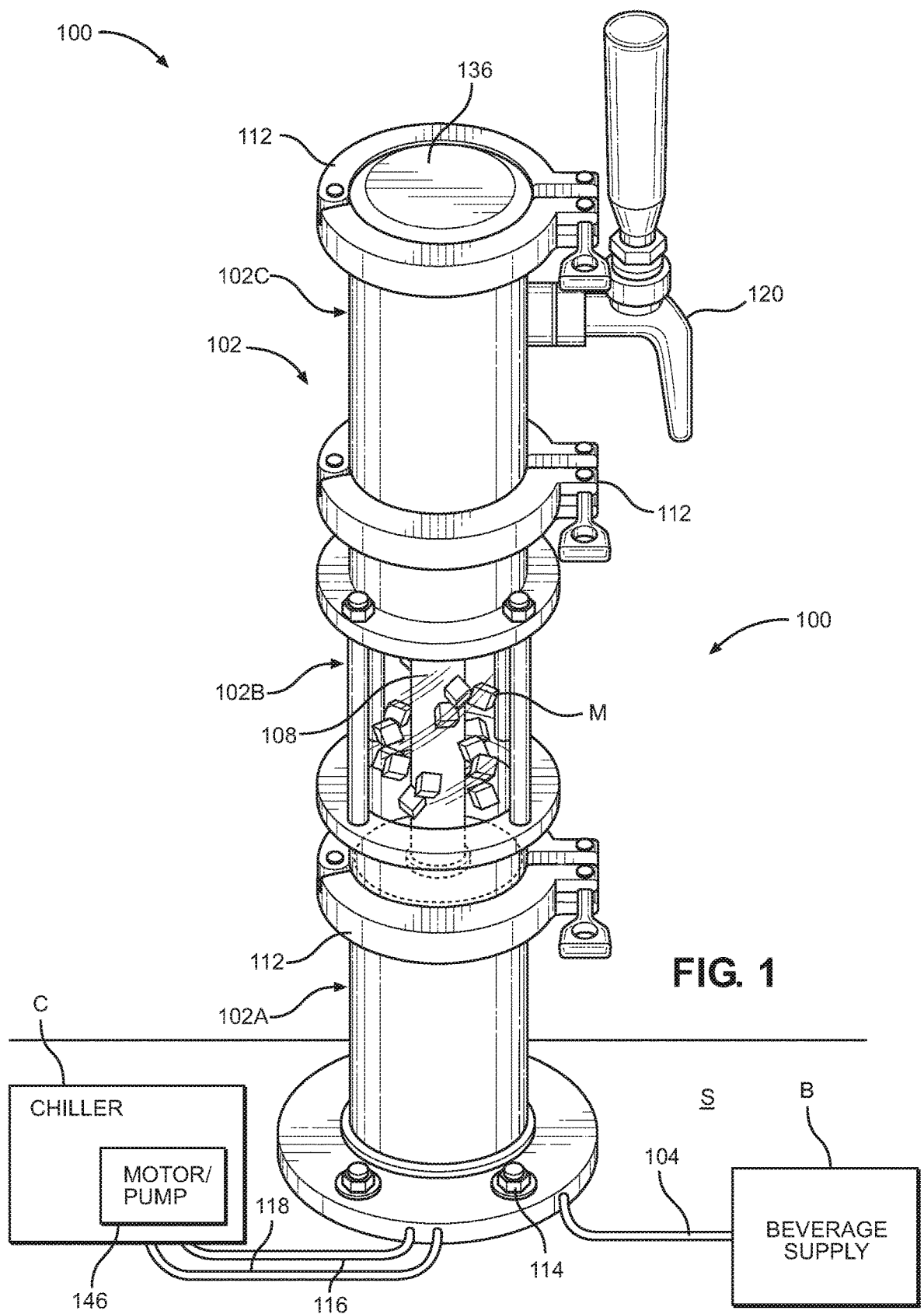
FIG. 1 depicts a beverage infusion system according to an embodiment of the present disclosure.
Figure 2:
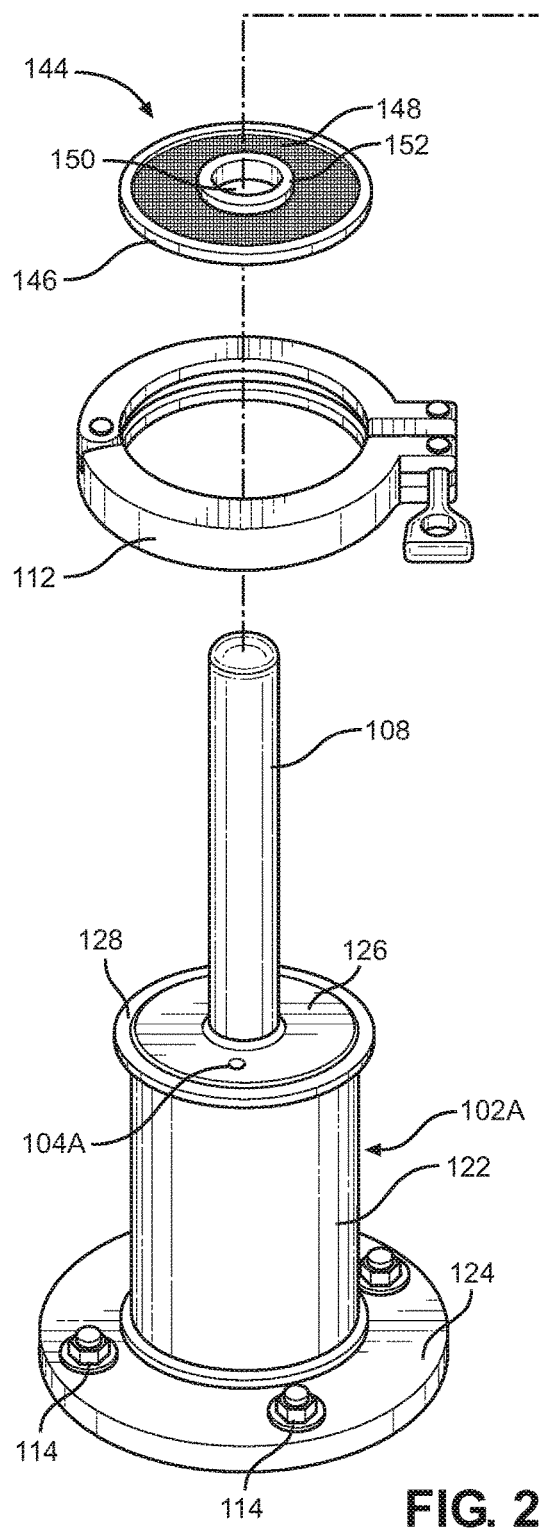
FIG. 2 is an exploded view of an infusion tower depicted in FIG. 1.
Figure 2:
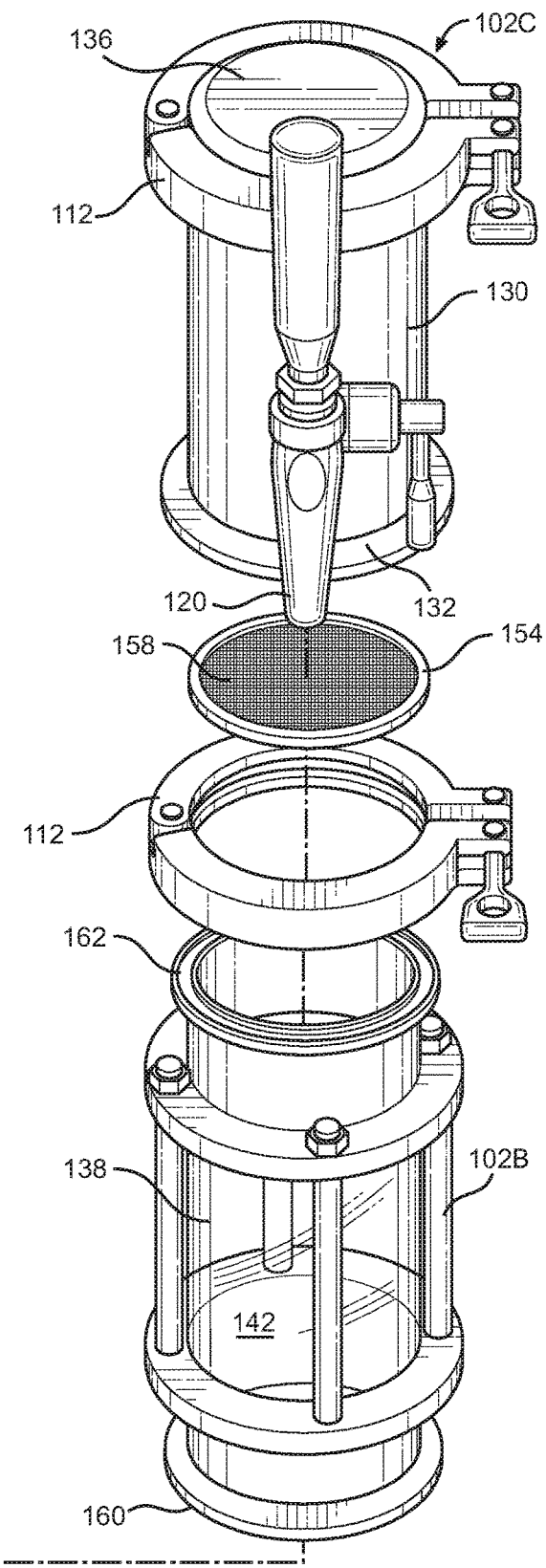
Figure 3:
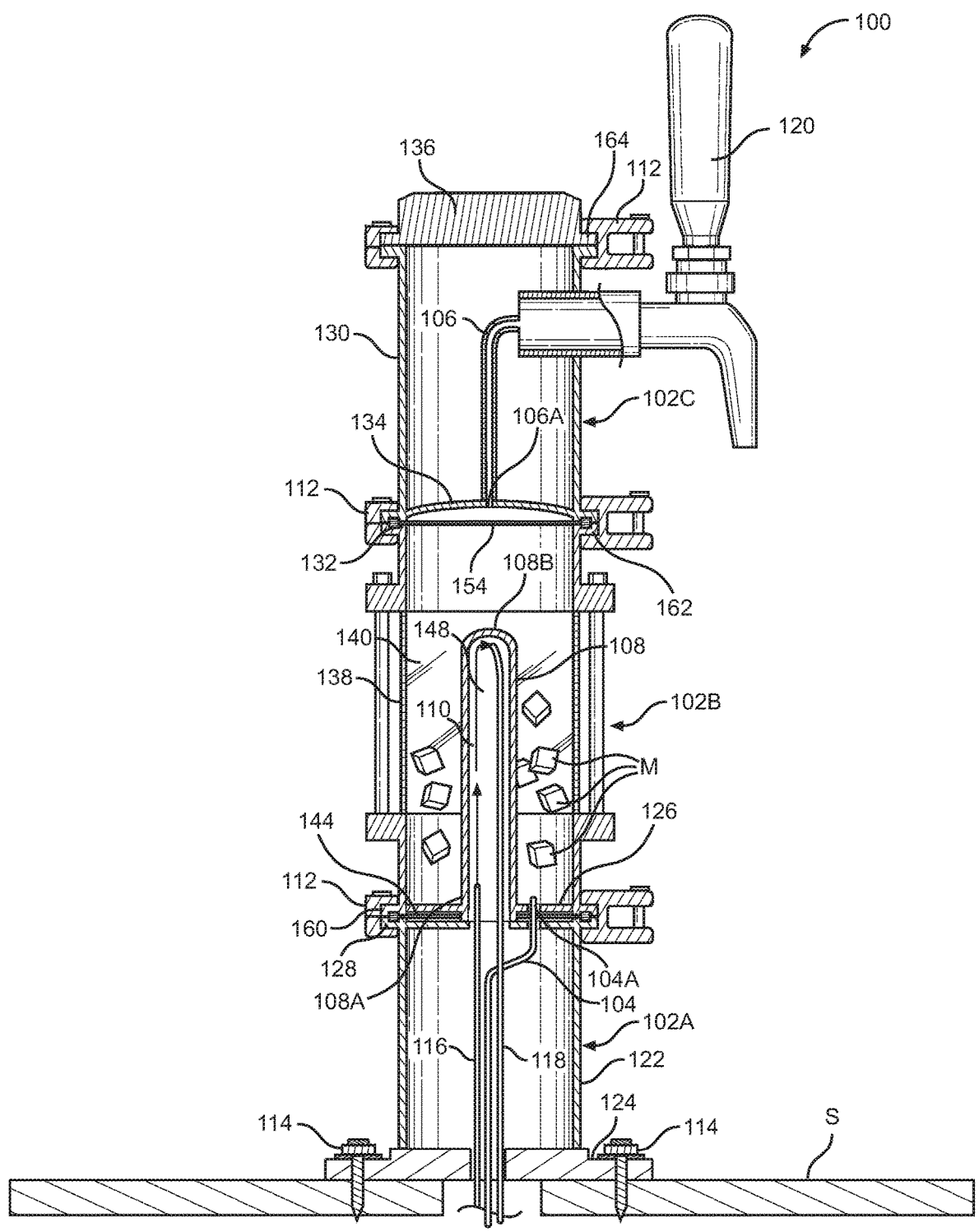
FIG. 3 is a cutaway view of the infusion tower depicted in FIG. 2.

With reference to FIGS. 1-3, there is provided a beverage infusion system 100 for infusing beverages while maintaining the desired pressure and temperature of the beverage. For example, certain beverages might benefit from being maintained at about 38 degrees Fahrenheit or less. The system 100 may also be used to maintain beverages at colder or warmer temperatures as well. The system 100 generally includes an infusion tower 102, a beverage inlet 104, a beverage outlet 106, a heat transfer probe 108, and a coolant path 110. An infusing material M is placed within the infusion tower 102 for infusing beverages flowing through the tower. Then, beverages are supplied to the infusion tower 102 from a beverage supply B via the beverage inlet 104. The beverage inlet 104 includes the necessary food-grade tubing (e.g., pressurized beverage hose) and connections necessary for supplying beverages, which are known in the art. In some cases, the beverage inlet 104 is pressurized by the beverage supply B. For example, the beverage supply B may be a keg and the beverage inlet 104 is pressured by the keg. Similarly, coolant is supplied to the infusion tower 102 from a coolant supply C via the coolant supply line 116. Beverages pass through the infusion tower, where they are chilled and, at the same time, infused. The infusion tower 102 maintains pressure of the beverage passing through it, such that the pressure of the beverage at the beverage outlet 106 is substantially equal to the pressure of the beverage at the beverage inlet 104. This ensures that the beverage does not lose carbonation during the infusing process.

The infusion tower 102 may be divided into three distinct sections, segregated by their function: a first section 102A, a second section 102B (also referred to herein as an infusion chamber), and a third section 102C. The sections 102A, 102B, 102C are configured to form a vertically-stacked tower. This mounting configuration allows for other components of the system 100 to be conveniently stored out of sight within under the mounting surface S (e.g., in the bar or under the countertop). The sections of the infusion tower 102 may be fixedly mounted together. However, in the embodiment shown, the sections are removably mounted together using sanitary clamps 112. Alternatively, the second section 102B may be removably secured between the first and second sections 102A, 102C by other suitable means, such as threaded coupling means, friction fitting means, interlocking fastening mechanisms, etc. Those of skill in the art will appreciate that there is wide array of brewery connection fittings that may be utilized in conjunction with the present invention to removably secure the infusion chamber sections 102A, 102B, 102C together and to otherwise couple or secure the various components of the system 100. An advantage of removably mounting the three sections 102A, 102B, 102C together is ease of access for repair or cleaning.

The first section 102A of the tower 102 includes an outer housing 122, which protects and guides the beverage inlet 104, coolant supply line 116 and coolant return line 118 to the second section 102B. A bottom flange 124 is mounted to and extends outwards from the bottom of the housing 122. The tower may be mounted to a mounting surface S, such as a countertop, bar, wall, etc., using connectors 114, such as threaded fasteners, that are passed through the bottom flange 124. The bottom of the housing 122 is preferably left open to permit access for maintenance, cleaning, etc. of the first section 102A. A top plate 126 is mounted to and encloses the top of the housing 122. A top flange 128 extends outwards from the top of the outer housing 122. The beverage inlet passes through the top plate 126 and terminates at an opening 104A, which permits beverage to flow upwards into the second section 102B.

The first section 102A also holds the heat transfer probe 108. The heat transfer probe 108 extends upwards away from the top plate 126, such that it extends into the second section 102B of the infusion tower 102. When the first section 102A and the second section 102B are connected together, the heat transfer probe 108 extends upwards from the first section into the infusion chamber 102B (i.e., the second section). Beverage flowing out of the opening 104A of the first section 102A fills the second section 102B and flows past the heat transfer probe 108, which cools the beverage. The elongate heat transfer probe 108 has a first end 108A that is mounted to the top plate 126 of the first section 102A. The probe 108 extends upwards such that its second end 108B is located inside the second section 102B of the infusion tower 102. The probe 108 preferably terminates near the top of the second section 102B in order to maximize cooling the beverage.

The heat transfer probe 108 includes an internal void space 148 that holds a quantity of coolant. The coolant flow path 110 is a continuously flowing path of coolant formed within the void space 148 of the heat transfer probe 108. The primary purpose of the coolant path 110 is to continuously carry chilled coolant to the heat transfer probe 108 and warm coolant away from the probe. Chilled coolant is carried to the heat transfer probe 108 via the coolant supply 116, where it absorbs heat away from the beverage. After flowing within the heat transfer probe 108, the coolant flows back to the chiller C via the coolant return line 118. Preferably, the coolant supply 116 terminates within the void space 148 near the first end 108A of the probe 108 and the coolant return line extends upwards through the probe 108 and terminates within the void space 148 near the second end 108B of the probe. This arrangement allows the coolant to substantially fill the void space 148. In some embodiments, the coolant path 110 is not a re-circulating path and the warm coolant (at temperature T1) may be disposed of and new chilled coolant (at temperature T2) may be continuously provided. Note: temperature T1 is higher than temperature T2. However, more preferably, the coolant path 110 includes a re-circulating chiller C having a motor/pump 146 that recirculates the coolant. Preferably, the chiller C utilizes a food-grade refrigerant for lowering the temperature of the coolant. One non-limiting example of a suitable chiller is a glycol chiller. Any suitable coolant may be used in conjunction with the coolant probe, such as propylene glycol.

The third section 102C is located at the top of the infusion tower 102 and is used for dispensing chilled beverages. The third section 102C includes an outer housing 130 that surrounds and protects the beverage outlet 106. A bottom flange 132 extends outwards from the bottom of the outer housing 130. A bottom plate 134 is mounted to the bottom of the outer housing 130. The beverage outlet 106 begins at an opening 106A that is formed in the bottom plate 134. From the opening 106A, the beverage outlet 106 passes through the bottom plate 134, through the third section 102C and connects to the faucet 120. In this particular case, the faucet 120 is a tap that is mounted to the outer housing 130 of the third section 102C. In some cases, the bottom plate 134 is flat. However, in the embodiment shown, the bottom plate is curved into a funnel shape and the opening 106A is located at the center of the funnel. This causes the beverage to flow smoothly through the beverage outlet 106.

Figure 4:
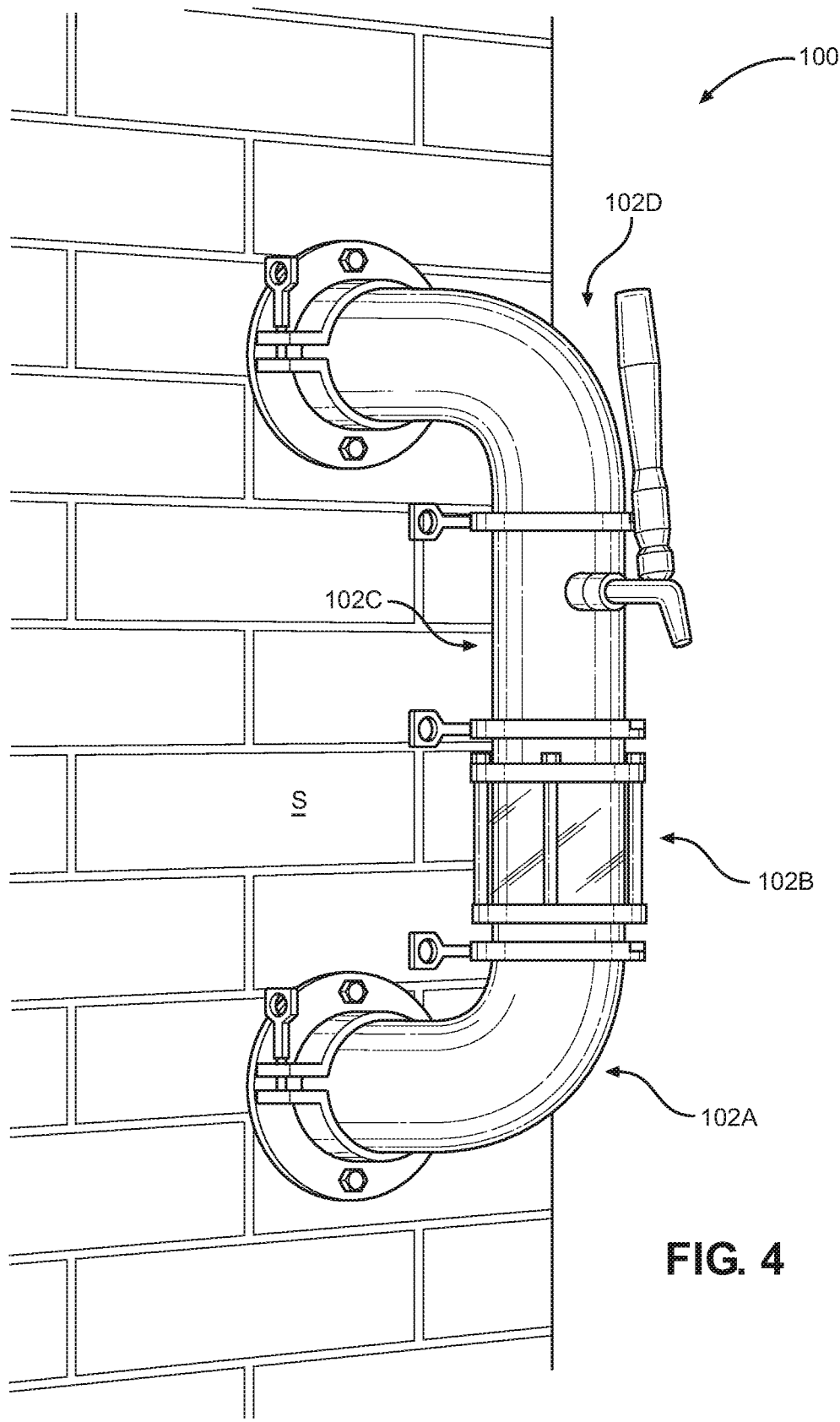
FIGS. 4 and 5 are alternative embodiments of a beverage infusion system of the present disclosure.
Figure 5:
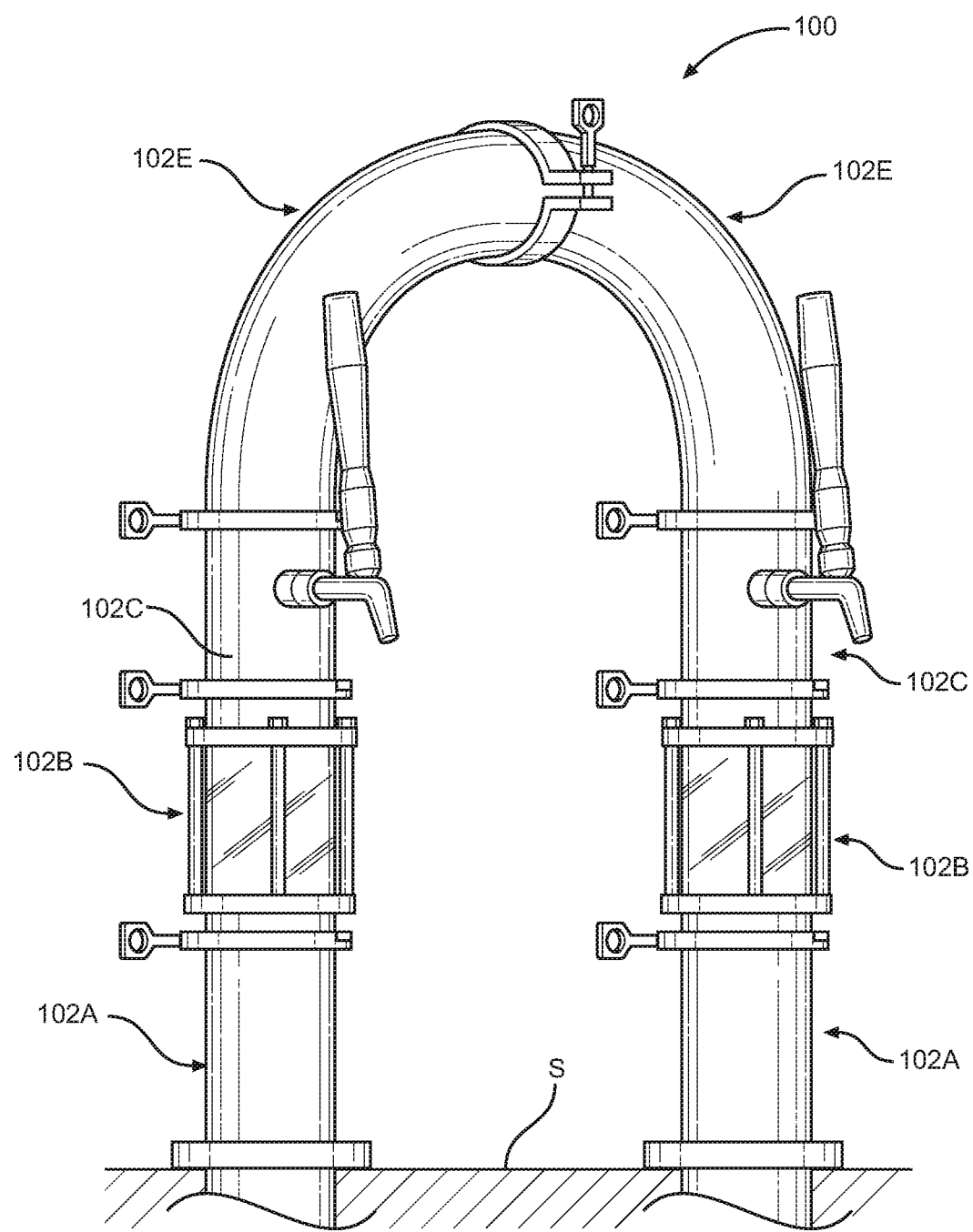

The third section 102C may also include a removeable top cover 136, which permits access to the interior of the third section for maintenance, cleaning, etc. The top cover 136 is secured to a top flange 164 of the third section 102C by a sanitary clamp 112. In other embodiments, other components may be secured to the top flange 136 of the third section 102C using a clamp 112. For example, in FIG. 4, a wall-mounted version of the system 100 is provided. One end of a fourth section 102D is connected to the top of the third section 102C. The opposite end of the fourth section 102D is connected to the mounting surface S, which, in this case, is a wall. Similarly, the first section 102A is also mounted to the mounting surface S. This configuration would enable the beverage source B and coolant source C to be stored behind the system 100, such as in a different room. Yet another embodiment is provided in FIG. 5, where two infusion chambers are connected together by connector sections 102E. This particular connector section is an elbow shape. However, other shapes, such as Y or T shaped connectors, may be used to connect together more than two infusion chambers.

Returning to FIGS. 1-3, the second section 102B is located between the first section 102A and the third section 102C. The second section 102B includes an outer housing 138 that forms an internal volume 140 where the infusing material M may be placed. A bottom flange 160 extends outwards from the bottom of the outer housing 138, and an upper flange 162 extends outwards from the top of the outer housing. The top flange 128 of the first section 102A may be joined together with a bottom flange 160 of the second section 102B in order to join together the lower two sections of the infusion tower 102. Similarly, the bottom flange 132 of the third section 102C may be joined together with a top flange 162 of the second section 102B in order to join together the upper two sections of the infusion tower 102. Again, each of these connections are secured together using a sanitary clamp 112 or some other suitable joining means.

The ends of the of the second section 102B are open. When the three sections 102A, 102B, 102C are stacked to form the tower 102, the top plate 126 of the first section 102A acts as a first enclosing member for the open bottom end of the second section 102B. Additionally, the bottom plate 134 of the third section 102C acts as a second enclosing member for the open top end of the second section 102B. When stacked in this manner and secured by clamps 112 (or other connectors), the infusion tower 102 is fluid and pressure-tight, which is important for maintaining the carbonation of the beverage.

To further improve the seal formed between each of the sections of the infusion tower 102, gaskets may be placed between each of the sections. In this particular embodiment, gaskets mounted to filters are provided between each section of the infusion tower 102. A first filter 144 having a peripheral gasket 146 and a filter area 158 is removably mounted between the first section 102A and the second section 102B. The first filter 144 is positioned such that the filter area 158 covers the opening 104A located in the top plate 126. The filter 144 advantageously filters particulate matter in the beverage supply 104 from entering the infusion chamber 102B and also filters particulate matter, such as the infusing material M, from leaving the infusion chamber via the beverage inlet 104. To accommodate the heat transfer probe 108, an aperture 150 is provided in the first filter 144. An inner gasket 152 surrounding the aperture 150 forms a secure seal between the first filter 144 and the heat transfer probe 108. Additionally, a second filter 154 having a peripheral gasket 156 and a filter area 158 is removably mounted between the second section 102B and the third section 102C. The second filter 154 is positioned such that the filter area 158 covers the opening 106A located in the bottom plate 134. The filter 154 advantageously filters particulate matter in the beverage outlet 106 from entering the infusion chamber 102B and also filters particulate matter, such as the infusing material M, from leaving the infusion chamber via the beverage outlet 106.

The second section 102B may include a viewing panel 142 or sight glass that is formed as part of the outer housing 142. The viewing panel 142 allows a user to view the infusing material M and beverage present within. The viewing panel 142 may be constructed of any suitable material, such as glass or food-grade plastic. In some embodiments, the viewing panel 142 may include a UV-protective coating to protect the selected infusion ingredients against UV degradation.

In use, when the faucet 120 is opened by a user, the beverage to be infused travels from the beverage supply B, through the bottom filter 144, to the infusion chamber 102B and into communication with the infusing material M located there. Within the infusion chamber 102B, the beverage is maintained under pressure. Additionally, the beverage and selected infusing material M are maintained at the desired temperature by the heat transfer probe 108. The infused beverage then travels through the top filter 154, along the collection funnel 134, through the beverage outlet 106, and then out via the dispensing faucet 120.

The foregoing description of preferred embodiments for this disclosure has been presented for purposes of illustration and description. It is not intended to be exhaustive or to limit the disclosure to the precise form disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A beverage infusion system comprising:
an infusion chamber configured to hold an infusing material and to allow a beverage to flow through the infusion chamber past the infusing material such that the beverage is infused by the infusing material, wherein the infusion chamber is formed by:
an outer housing having a first end and a second end and openings formed at each end,
a first enclosure member configured to removably mount to the first end of the outer housing and to cover the opening located at the first end of the outer housing, and
a second enclosure member configured to removably mount to the second end of the outer housing and to cover the opening located at the second end of the outer housing;
a beverage inlet in fluid communication with the infusion chamber for carrying the beverage to the infusion chamber;
a beverage outlet in fluid communication with the infusion chamber for carrying the beverage to away from the infusion chamber;
a heat transfer probe inside the infusion chamber and positioned such that the beverage entering the infusion chamber via the beverage inlet and exiting via the beverage outlet flows past the heat transfer probe;
a coolant path operable for carrying a coolant through the heat transfer probe,
wherein, when the coolant is at a lower temperature than the beverage flowing through the infusion chamber, heat is carried away from the beverage and is transferred through the coolant probe to the coolant as the beverage flows past the coolant probe,
wherein the infusion chamber maintains pressure of the beverage passing through it, such that the pressure of the beverage at the beverage outlet is substantially equal to the pressure of the beverage at the beverage inlet, and
wherein the beverage infusion system further comprising a first filter configured to removably mount between the first enclosure member and the outer housing, such that the first filter covers the opening located at the first end of the outer housing and is positioned between the beverage inlet and the infusion chamber.

2. The beverage infusion system of claim 1 wherein the beverage inlet is formed in the first enclosure member and the beverage outlet is formed in the second enclosure member.

3. The beverage infusion system of claim 2 wherein the second enclosure member includes a funnel-shaped inner surface located within the infusion chamber for funneling beverage being carried away from the infusion chamber through the beverage outlet, which beverage outlet includes an opening formed in the second enclosure member that is located at the center of the funnel shape.

4. The beverage infusion system of claim 1 wherein the heat transfer probe is an elongate probe having a first end mounted to and extending away from the first enclosure member and a second end located within the infusion chamber proximate the second enclosure member.

5. The beverage infusion system of claim 4 wherein the coolant path includes:
a void space located within the heat transfer probe operable to hold a quantity of coolant;
a coolant inlet tube extending into the heat transfer probe through the first enclosure member and terminating within the void space proximate the first end of the heat transfer probe, and
a coolant outlet tube extending into the heat transfer probe through the first enclosure member and terminating within the void space proximate the second end of the heat transfer probe,
wherein coolant flowing along the coolant path flows into the heat transfer probe via the coolant inlet tube, fills the void space, and excess coolant flows out of the heat transfer probe via the coolant outlet tube.

6. The beverage infusion system of claim 1 wherein heat transfer probe is an elongate probe having a first end mounted to and extending away from the first enclosure member through the opening located at the first end of the outer housing and wherein the first filter includes an aperture that enables the heat transfer probe to pass through the first filter.

7. The beverage infusion system of claim 1 further comprising a second filter configured to removably mount between the second enclosure member and the outer housing, such that the second filter covers the opening located at the second end of the outer housing and is positioned between the beverage outlet and the infusion chamber.

8. The beverage infusion system of claim 1 further comprising plates located on each of the first and second enclosure members for covering the openings at the first end and second end of the outer housing, respectively.

9. The beverage infusion system of claim 8 further comprising:
flanges disposed on the plates and on the first end and second end of the outer housing; and
clamps for removably clamping the flanges of the plates to the flanges on the first and second ends of the outer housing.

10. The beverage infusion system of claim 1 wherein at least a portion of the outer housing is transparent in order to provide a sight glass into the infusion chamber.

11. The beverage infusion system of claim 1 further comprising a recirculating coolant chiller disposed along the coolant path for carrying coolant at a first temperature T1 away from the infusion chamber, lowering the temperature of the coolant to a second temperature T2 which is lower than first temperature T2, and flowing the coolant back to the infusion chamber at the second temperature T2.

12. The beverage infusion system of claim 1 further comprising a tap mounted at an end of the beverage outlet.

\* \* \* \* \*